(No Model.)
W. HUGHES.
HORSE COLLAR FASTENING.
No. 539,180. Patented May 14, 1895.
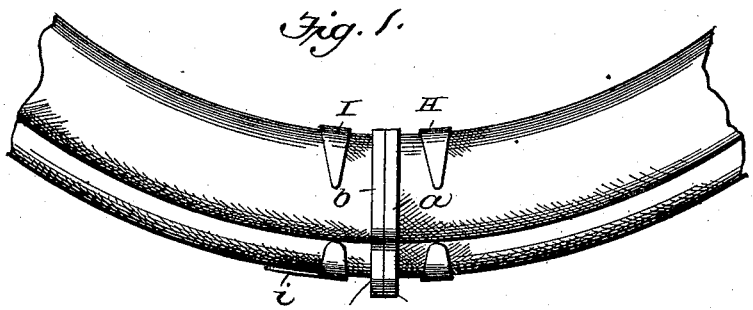
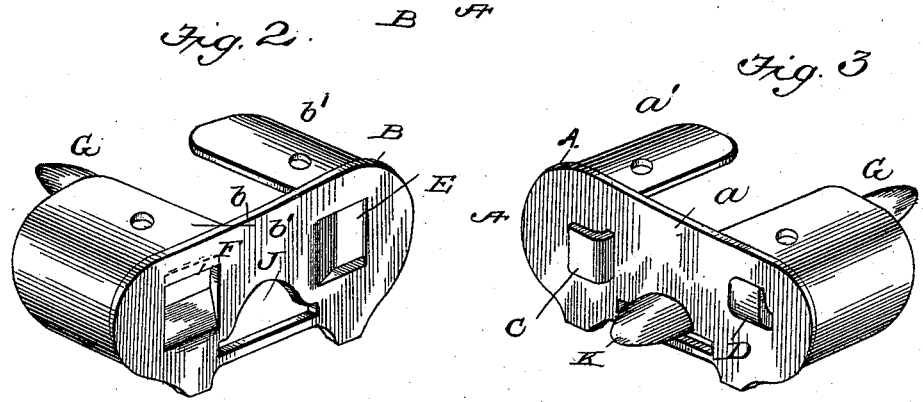
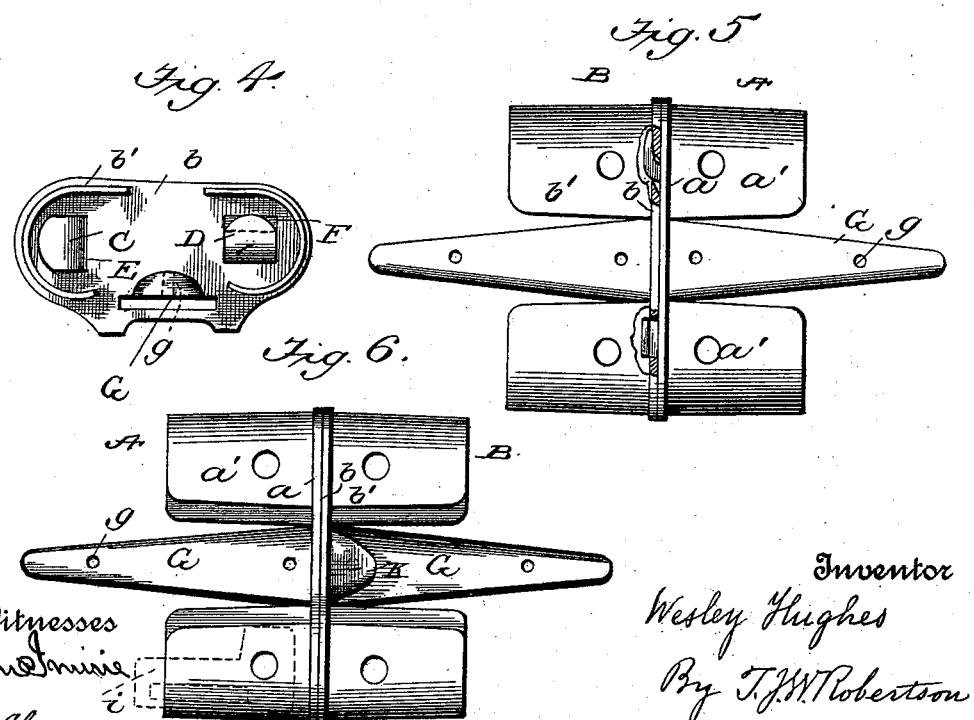
Witnesses
Inventor
Wesley Hughes
By T. J. W. Robertson
Attorney

United States Patent Office.

WESLEY HUGHES, OF SENECA, KANSAS.

HORSE-COLLAR FASTENING.

SPECIFICATION forming part of Letters Patent No. 539,180, dated May 14, 1895.

Application filed June 2, 1894. Serial No. 513,274. (No model.)

*To all whom it may concern:*

Be it known that I, WESLEY HUGHES, a citizen of the United States, residing at Seneca, county of Nemaha, and State of Kansas, have invented certain new and useful Improvements in Horse-Collar Fastenings, of which the following is a specification, reference being had therein to the accompanying drawings.

This invention is designed to provide a collar fastening of that style having projecting lugs on one half entering into apertures in the other half, which will be strong, convenient and durable, and it consists in the improvements hereinafter more particularly described and then definitely claimed.

In the accompanying drawings, Figure 1 is a side view of the lower part of a collar with a fastening constructed according to my improvement. Fig. 2 is a perspective view of one section of my fastening, detached. Fig. 3 is a similar view of the other section, also detached. Fig. 4 is an end view of the two sections of the fastening united, but detached from the collar. Fig. 5 is a plan of the two sections united, with parts broken away. Fig. 6 is a reverse plan of the same.

Referring now to the details of the drawings by letter, A represents the male section and B the opposite section, the former having two lugs C D which enter openings E F in the opposite section. These lugs are turned at right angles to each other as shown—that is to say, one is turned upward or vertically while the other is turned laterally or horizontally.

At the bottom of each section is an ear G which sets in the crease made for the reception of the hames and is secured there by screws or rivets, passing through holes $g$ formed in said ears.

In each of the face plates $a\ b$ of the sections is formed an aperture J to receive the hame strap (or it may be any other strap) which will, when inserted, prevent the sections becoming uncoupled.

When making the collar, the outer leather is set over the flanges $a'\ b'$ and is there secured by screws or rivets passing through said leather and flanges. To make the matter more secure, I prefer to use curved washers or washers and nuts above and below, as shown at H, I, in Fig. 1. The latter I prefer to provide with a loop $i$ to receive the "hold back strap" when desired.

To fasten the collar, the ends are given a slight twist to bring the sections of the fastening a little out of line with each other. Then the lug C is inserted in the opening E, and the sections A are moved laterally to force the lug C "home," after which the lug D is inserted in the opening F, and the sections are then brought in line by allowing the ends of the collar to assume their normal positions with respect to each other, when it will be found that the ends of the collar are so securely fastened together, that there is no probability of their coming unfastened, but as a matter of precaution, I prefer to set hame or other straps through the apertures J in which condition it is impossible to separate the sections of the fastenings. As a further means of security in the fastening, I provide the section A with the tongue K, which enters the upper part of the opening F in the section B.

From the above description and drawings, it will be seen that I have provided a collar with a fastening that will securely hold the ends of the collar together, without changing its shape, and one that is easily put on the collar, either when first made or as an improvement on an old collar, for it is so simple that any ordinary farmer may cut his collar in two and insert the sections of the fastening.

It will be observed that one edge of each of the openings in the face of the sections into which the lugs enter is inclined, and that the opposite edge on the inside of the section is inclined also, so that the openings are really made in a diagonal direction through the face of the section—one of the openings being set diagonally crosswise of the collar, while the other is set diagonally upward or downward as the case may be. This makes the fastening more secure, because when the final twist is given to the collar when fastening it, the two sections are drawn close together, which drawing together is due to the inclined or diagonal position of the opening.

I am aware that it is not new to make collar fastenings with two projecting lugs pointing in opposite directions on one section, which enter corresponding openings in the other section, such being shown in the United States Patents Nos. 108,418 and 334,370, and make no claim to anything shown therein. I regard my invention as differing essentially from these patents, for in the devices shown therein a single slight twist of the collar will allow the two parts of the fastening to separate; whereas, by my invention, the collar has to be first twisted, by which the sections of the fastening are slightly separated, and one lug withdrawn, and then the fastening has to be moved sidewise before the other lug can be withdrawn, whereby a much more secure fastening is provided, as it will hold without the strap usually provided to keep the parts from separating.

What I claim as new is—

1. In a collar fastening, a section having openings therein, each opening having one of its edges inclined, and said inclined edges arranged at right angles to each other, in combination with a second section, provided with two lugs, having their entering ends turned at right angles to each other, and adapted to enter the openings in the opposite section, substantially as described.

2. In a collar fastening, a section having inclined edged slots therein, arranged at right angles to each other, in combination with a second section provided with two lugs, having their entering ends turned at right angles to each other, and adapted to enter the openings in the opposite section, both sections having openings to receive a locking strap, substantially as described.

3. As a new article of manufacture, a fastening for a collar provided with face plates, two lugs on one face plate arranged at right angles to each other, and corresponding inclined edged slots in the other, openings in both of said face plates adapted to receive a locking strap, and flanges of less diameter than the face plates extending backward from the face plates, arranged to pass inside the leather of the collar, substantially as described.

In testimony whereof I affix my signature in presence of two witnesses.

WESLEY HUGHES.

Witnesses:
 E. A. KIBBE,
 F. T. INGALLS.